UNITED STATES PATENT OFFICE.

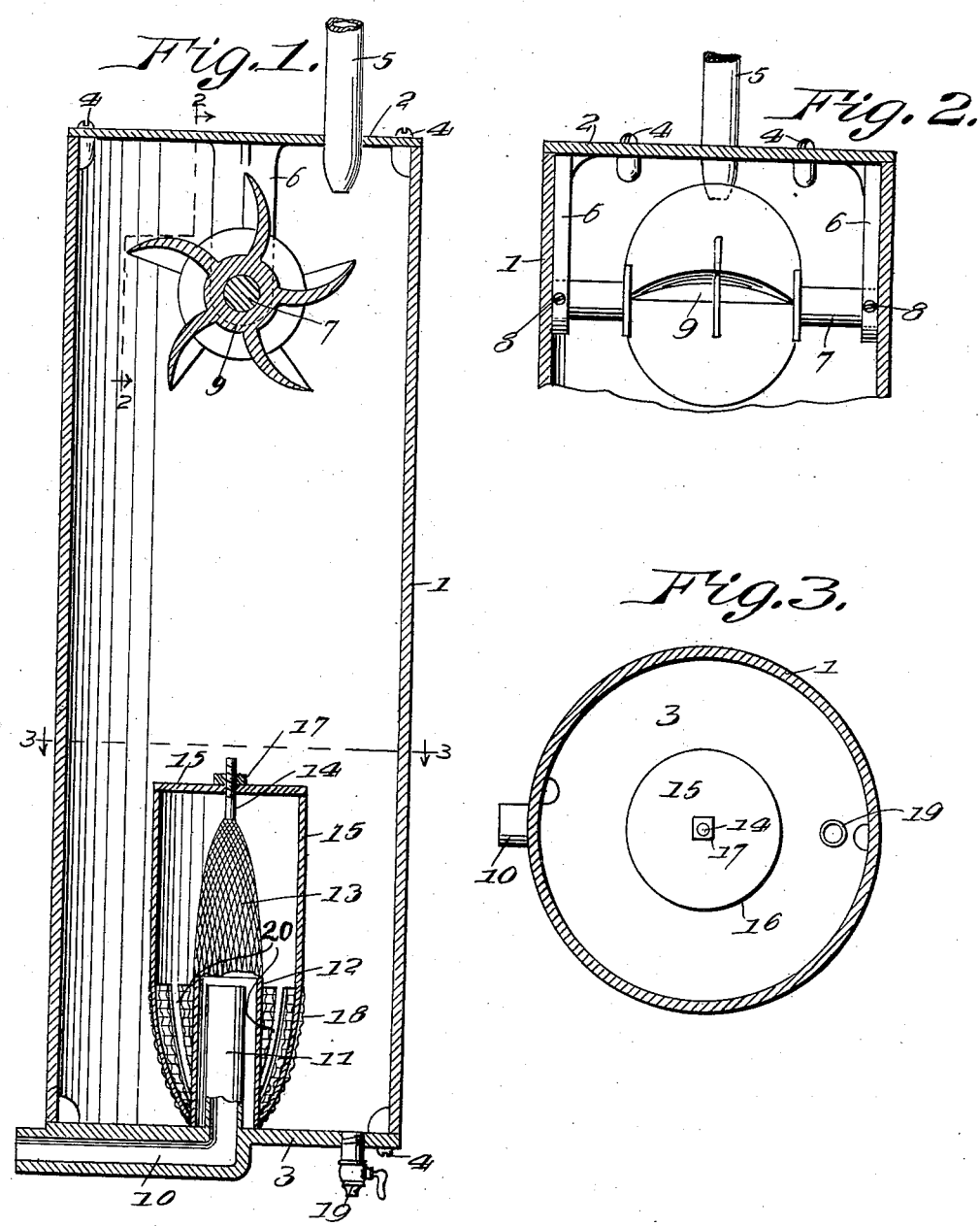

ANTONIO SULLIVAN, OF BRIDGEPORT, CONNECTICUT.

FILTER.

1,069,042.  Specification of Letters Patent.  Patented July 29, 1913.

Application filed March 5, 1913. Serial No. 752,163.

*To all whom it may concern:*

Be it known that I, ANTONIO SULLIVAN, a citizen of the United States, residing in the city of Bridgeport, county of Fairfield, State of Connecticut, have invented certain new and useful Improvements in Filters; and I do declare the following to be a full, clear, and exact description of the invention, such as will enable others skilled in the art to which it appertains to make and use the same.

This invention relates to certain new and useful improvements in filters, and the object thereof is to provide a filter of simple, improved and economical construction, wherein the parts can be easily made and assembled and one wherein the parts are carried by the top and bottom, which latter are removable, to thereby allow quick, easy and convenient cleansing, or repair of the parts by simple removal of the top and bottom.

Further the invention aims to provide improved and novel filtering means, by which the water is thoroughly filtered.

In the drawings: Figure 1 is a vertical sectional view of the invention; Fig. 2 is a section taken on the line 2—2 of Fig. 1; and Fig. 3 is a section taken on the line 3—3 of Fig. 1.

The filter consists of a body 1, preferably of cylindrical form, which has a top 2 and a bottom 3, the cover and bottom being removably held in position on the body by means of screws 4. The top 2 is provided with an opening into which a nozzle 5 projects, the nozzle serving to conduct the water from a faucet or other source of supply not shown.

Secured to the top 2 and projecting downwardly therefrom, are a pair of diametrically arranged arms 6, which arms preferably engage the adjacent walls of the body in order to be braced thereby. The lower ends of the arms 6 have a shaft 7 rigidly secured thereto by means of set screws 8, and revolubly mounted on the shaft is a wheel 9, the blades of which are concaved or dished, the wheel being positioned so as to receive the water from the nozzle 5 and be rapidly rotated thereby, in order to break up the water into sprays, thus cooling same.

The bottom 3 is formed on its under face with an outlet passage 10, which communicates with a short vertical delivery pipe 11, the latter being surrounded by a sleeve 12 which is spaced from the pipe and has its top end extending slightly above the top end of the pipe 11. A cone-shaped screen 13 has its base suitably secured to the upper end of the sleeve 12. The apex of the cone has a short upwardly extending threaded stem 14 affixed thereto, the upper end of the stem extending through an aperture provided therefor in the closed top 15 of a casing 16. A nut 17 is threaded onto stem 14 and seats on the top 15. The lower end of the casing 15 is open and terminates at a point below the upper end of sleeve 12, a screen 18 being affixed to said lower end of the casing and extending downwardly and inwardly to embrace the lower end of sleeve 12 and to engage the bottom 3. By the aforementioned means it will be seen that the several parts are held in their relative positions against movement. A drain cock 19 is connected to the bottom 3 for purpose of draining off any sediment or other foreign matter.

In operation, any filtering material, such as fine pebbles or charcoal may be placed within the screen 18 and packed against the latter and the sleeve 12. The water gravitates to the bottom and passes through the screen 18 and said filtering material, and rising enters the casing 15 and passes through the screen 13, where a second filtering operation occurs. The water then gravitates down in the annular space between the delivery pipe 11 and the sleeve 12, until said space is filled, whereupon the water flows over the upper end of the delivery pipe 11 and enters the latter. It will thus be seen that the water must pass up through screen 18 and must also pass through screen 13 before it can enter the space between the sleeve 12 and the pipe 11 to overflow into the latter.

The casing 15 is preferably formed with a series of curved depending fingers 20 which extend from its lower open end to the base of sleeve 12, in order to form firm supports for the screen 18.

What is claimed is:

1. In a filter, a body, an outlet passage formed on the bottom, a vertical delivery pipe in communication with said passage, a sleeve surrounding the pipe in spaced relation thereto and having its upper end extending above the upper end of the pipe, a conical screen affixed at its base to said sleeve, a casing surrounding the cone and having an open lower end, said casing having a closed upper end, means to detachably connect the apex of the conical screen to the closed upper end of the casing, and a screen connected to the lower end of the casing and surrounding the base of the sleeve.

2. In a filter, a body, a vertical delivery pipe at the body bottom, a sleeve surrounding the pipe in spaced relation thereto, a casing having a closed top and an open bottom, the casing overlying the sleeve and pipe and surrounding the same in spaced relation thereto, a substantially cone-shaped screen between the upper end of the sleeve and the top of the casing, the lower end of the casing being spaced from the body bottom and being open, curved depending fingers extending from the lower end of the casing to the lower end of the sleeve and a screen between said lower end of the casing and the bottom of the body engaging over the fingers.

3. In a filter, a body having an outlet in its bottom, a sleeve surrounding the outlet, a filtering screen carried by the upper end of the sleeve and having a threaded stem extending upwardly from the upper end of the screen, a casing having a perforated closed upper end and an open lower end, said stem extending through the perforation in said upper end of the casing and having a nut thereon which seats on the outer face of the closed end of the casing, and a screen secured to the open lower end of the casing and engaging the sleeve.

4. In a filter, a body having an outlet in its bottom, a sleeve surrounding the outlet, a filtering screen carried by the upper end of the sleeve and having a threaded stem extending upwardly from the upper end of the screen, a casing having a perforated closed upper end and an open lower end, said stem extending through the perforation in said upper end of the casing and having a nut thereon which seats on the outer face of the closed end of the casing, fingers depending from the lower end of the casing and engaging the sleeve periphery, and a screen surrounding the fingers and engaging the latter.

In testimony whereof I affix my signature in presence of two witnesses.

ANTONIO SULLIVAN.

Witnesses:
F. W. SMITH, Jr.,
M. T. LONGDEN.

---

Copies of this patent may be obtained for five cents each, by addressing the "Commissioner of Patents, Washington, D. C."